(12) United States Patent
Puterbaugh et al.

(10) Patent No.: US 6,478,102 B1
(45) Date of Patent: Nov. 12, 2002

(54) VEHICLE BODY SUSPENSION SYSTEM

(75) Inventors: Benjamin S. Puterbaugh, Fort Wayne; Michael A. Taylor, Columbia City; Lucas E. Satter, Fort Wayne, all of IN (US); Mark H. Musselman, Oxford, MI (US)

(73) Assignee: International Truck Intellectual Property Company, L.L.C., Warrenville, IL (US)

( * ) Notice: Subject to any disclaimer, the term of this patent is extended or adjusted under 35 U.S.C. 154(b) by 0 days.

(21) Appl. No.: 09/838,990

(22) Filed: Apr. 21, 2001

(51) Int. Cl.[7] .................. B62D 33/063; B60G 11/00
(52) U.S. Cl. .............. 180/89.12; 280/124.177; 280/296; 280/190.07
(58) Field of Search .............. 280/124.177; 180/89.12; 296/190.07; 267/292

(56) References Cited

U.S. PATENT DOCUMENTS

| | | | | |
|---|---|---|---|---|
| 2,891,785 A | * | 6/1959 | Sando et al. | 267/134 |
| 3,263,985 A | * | 8/1966 | Planta | 267/141.6 |
| 3,376,031 A | * | 4/1968 | Lee | 267/136 |
| 3,762,694 A | * | 10/1973 | MacDonnell | 105/198.2 |
| 4,053,148 A | | 10/1977 | Chalmers | |
| 4,135,757 A | * | 1/1979 | Smith et al. | 296/190.03 |
| 4,256,292 A | | 3/1981 | Sullivan, Jr. et al. | |
| 5,520,259 A | * | 5/1996 | Onohara et al. | 180/89.12 |
| 5,868,384 A | | 2/1999 | Anderson | |
| 5,984,036 A | * | 11/1999 | Higuchi et al. | 180/89.12 |
| 6,017,073 A | * | 1/2000 | Lindblom et al. | 296/190.07 |

\* cited by examiner

Primary Examiner—Paul N. Dickson
Assistant Examiner—Tony Winner
(74) Attorney, Agent, or Firm—Jeffrey P. Calfa; Neil T. Powell; Dennis Kelly Sullivan

(57) ABSTRACT

A vehicle includes a body structure that is suspended from a chassis of the vehicle by a vehicle body suspension system. The vehicle body suspension system is constructed in a manner to allow relative movement to occur between the suspended body structure and the chassis in such a manner to at least partially isolate the suspended body structure from the vibrations and accelerations of the chassis. The vehicle body suspension system includes one or more spring/damper components that comprise an elastomer body that is surrounded and, therefore, reinforced by a reinforcing wall constructed of a relatively rigid material. The vehicle body suspension system may utilize one or more of the reinforced elastomer block spring/damper components as bump stops and/or primary spring/damper components.

16 Claims, 13 Drawing Sheets

VEHICLE BODY SUSPENSION SYSTEM

BACKGROUND OF THE INVENTION

The present invention relates to vehicle body suspension systems which are suspension systems that suspend a body structure such as an operator cabin from a chassis of a vehicle. In particular the present invention relates to vehicle body suspension systems that ensure proper retention of a body structure to the vehicle while allowing a limited amount of relative movement between the body structure and the chassis of the vehicle. Body structures of vehicles are mounted to vehicle chassis with such vehicle body suspension systems, instead of being rigidly mounted to the chassis, in order to at least partially isolate the body structures from the vibrations and impacts that the chassis of the vehicle undergoes during travel of the vehicle over various types of terrain. As is well known, such vehicle body suspensions generally include one or more spring/damper components. These spring/damper components are mounted to the vehicle in such a manner that, at least when a corresponding body structure is in certain positions relative to the chassis, the spring/damper components are engaged to both the body structure and the chassis directly or indirectly and resist relative motion between the body structure and the chassis in certain directions. Many different types of spring/damper components are known to be included in vehicle body suspensions The present invention relates particularly to vehicle body suspension systems that utilize elastomer block spring/damper components. Elastomer block spring/damper components consist primarily of an elastomer body that is a block of elastomer material. Each elastomer block spring/damper component of a vehicle body suspension system is utilized to resist relative motion in certain directions between the vehicle body structure suspended by the vehicle body suspension system and the chassis of the vehicle, when the vehicle body structure and the chassis of the vehicle are in certain positions relative to one another. In order to effect this result, such vehicle body suspension systems are constructed in such a manner that each of the elastomer block spring/damper components is compressed between components engaged to the body structure and components engaged to the chassis, at least when the vehicle body structure and the chassis of the vehicle are in certain relative positions. When an elastomer block spring/damper component is compressed between the body structure and the chassis of the vehicle in such a manner, the elastomer block spring/damper component resists relative motion between the body structure and the chassis of the vehicle in such a direction that the elastomer block spring/damper component would, be further compressed. Known vehicle body suspension systems that have utilized elastomer block spring/damper components have only utilized elastomer block spring/damper components that do not have any substantial reinforcement for the elastomer body of the elastomer block spring/damper component. Such unreinforced elastomer block spring/damper components can withstand only a limited amount of compression loading. As a result, in some situations the unreinforced elastomer block spring/damper components of known vehicle body suspension systems are somewhat prone to being damaged as a result of being subjected to substantial compression loading. Additionally, the unreinforced elastomer block spring/damper components that have been used in known vehicle body suspension systems generally have a relatively constant spring rate throughout their elastic range of compression. It is preferable in many cases, as is well known, to utilize in suspension systems spring/damper components that have a spring rate that progressively increases with increased displacement.

SUMMARY OF INVENTION

As a result, an object of the present invention is to provide a vehicle with a vehicle body suspension system that utilizes elastomer block spring/damper components that are capable of withstanding relatively large compressive loads.

The vehicle of the present invention comprises a chassis and one or more body structures such as an occupant cabin. Such a construction of a vehicle is well known. The vehicle of the present invention further includes a vehicle body suspension system which is an assembly of components that are engaged to the chassis of the vehicle and one or more of the body structures of the vehicle. The vehicle body suspension system of the vehicle of the present invention supports the one or more body structures that it is engaged to upon the chassis of the vehicle. The vehicle body suspension system is constructed and engaged to the other components of the vehicle in such a manner that relative motion between the body structure(s) it supports and the chassis is allowed. The vehicle body suspension system does, however, constrain the relative motion between the body structure(s) it suspends and the chassis to certain limits in all directions. Many constructions of vehicles and vehicle body suspension systems that are constructed and perform in such a manner are well known. As is well known, the vehicle body suspension system of the present invention includes one or more spring/damper components that resist relative motion between the suspended body structure and the chassis, when the body structure and the chassis are in certain positions relative to one another. The vehicle body suspension system of the present invention includes one or more elastomer block spring/damper components. Each of the elastomer block spring/damper components of the vehicle body suspension system of the present invention comprises an elastomer body that is a block of elastomer material. Each of the elastomer block spring/damper components of the vehicle body suspension system are mounted to the vehicle in such a manner that, at least when the suspended body structure and the chassis are in certain positions relative to one another, the elastomer block spring/damper is compressed between components engaged to the suspended body structure and components engaged to the chassis. When an elastomer block spring/damper component of the vehicle body suspension system is compressed between the suspended body structure and the chassis in such a manner, the elastomer block spring/damper resists movement between the suspended body structure and the chassis in a direction that would cause further compression of the elastomer block spring/damper component. The vehicle body suspension system of the present invention includes one or more reinforced elastomer block spring/damper components. A reinforcing wall constructed of a material that is very rigid as compared to the elastomer material of the elastomer body of the elastomer block spring/damper component surrounds at least a portion of the elastomer body of each reinforced elastomer block spring/damper component of the vehicle body suspension system of the present invention. The reinforcing wall of each reinforced elastomer block spring/damper component completely surrounds one or more cross-sections of the elastomer body perpendicular to a compression axis of the elastomer body. Because the reinforcing wall of each of the reinforced elastomer block spring/damper components surrounds the elastomer body in such a manner, Thus, outward expansion of the portion of the elastomer body of each of the reinforced elastomer block spring/damper components that is surrounded by the reinforcing wall is limited by the reinforcing wall. Therefore a reinforced elastomer block spring/damper component can withstand substantially greater compression loads than a similar elastomer block spring damper component without the reinforcing wall. Thus it can be seen that the above mentioned object, as well as others not mentioned, have been met by the vehicle and the vehicle body suspension system of the present invention.

DRAWINGS

Other objects and advantages of the invention will become more apparent upon perusal of the detailed description thereof and upon inspection of the drawings in which.

DETAILS OF INVENTION

Figure 1:
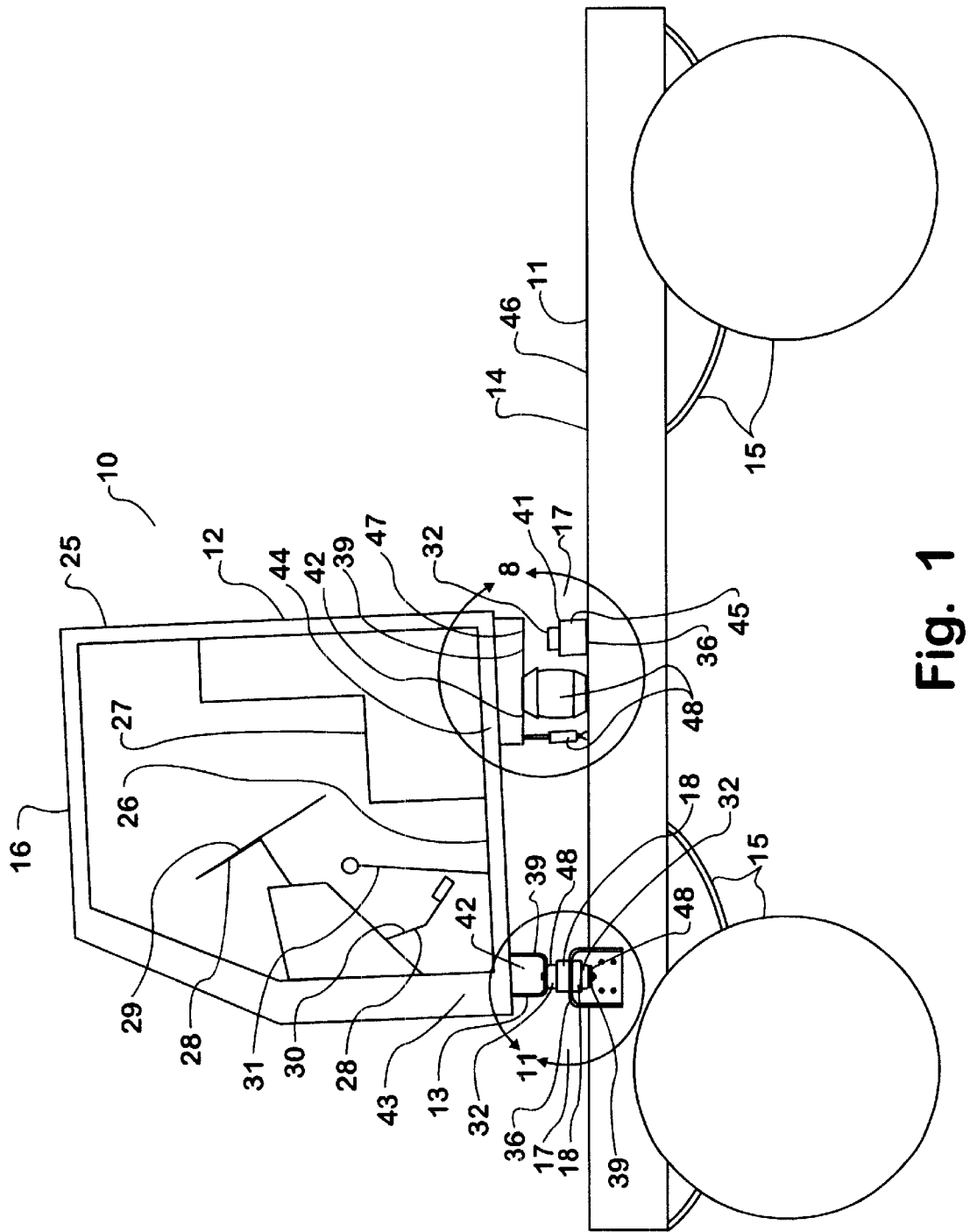
FIG. 1 is a side elevational view of one possible embodiment of a vehicle and a vehicle body suspension system according to the present invention.

There is shown in FIG. 1 a vehicle 10 with a chassis 11, a body structure 12, and a vehicle body suspension 13 according to the present invention. Most of the details of the construction of a vehicle as shown in FIG. 1 are well known. The vehicle 10 includes a chassis 11 which comprises a frame 14 and a primary suspension system 15. The frame 14 is a rigid structural assembly to which a large percentage of the components of the vehicle 10 are engaged directly or indirectly and from which a large percentage of the components of the vehicle 10 derive support directly or indirectly. The primary suspension system 15 is an assembly that provides the vehicle 10 with a relatively low resistance to translation along the ground. The primary suspension system 15 is also engaged to and supports the frame 14 of the vehicle 10 above the ground. The vehicle 10 of the present invention further includes a body structure 16 upon or within which objects and/or individuals may be supported by the vehicle 10. Many different types of such body structures 16 are known to be used in vehicles and the body structure 16 of the vehicle 10 of the present invention may be virtually any one of these numerous different types of body structures 16. The vehicle 10 of the present invention further includes a vehicle body suspension system 17 that is engaged to both the chassis 11 and the body structure 16 of the vehicle 10. The vehicle body suspension system 17 is constructed and engaged to the vehicle 10 in such a manner that it is supported by the chassis 11 of the vehicle 10 and the body structure 17 of the vehicle 10 is, in turn, supported by the vehicle body suspension system 17. The vehicle body suspension system 17 is also constructed and engaged to the vehicle 10 in such a manner that it allows relative movement between the body structure 16 and the chassis 11 in certain directions and within certain limited ranges. Many different constructions of vehicle body suspension systems 17 that provide such functionality are well known. The majority of the components and features of the vehicle body suspension system 17 of the present invention may be very similar or the same as virtually any one of these well known reconstructions of vehicle body suspension systems 17.

Figure 2:
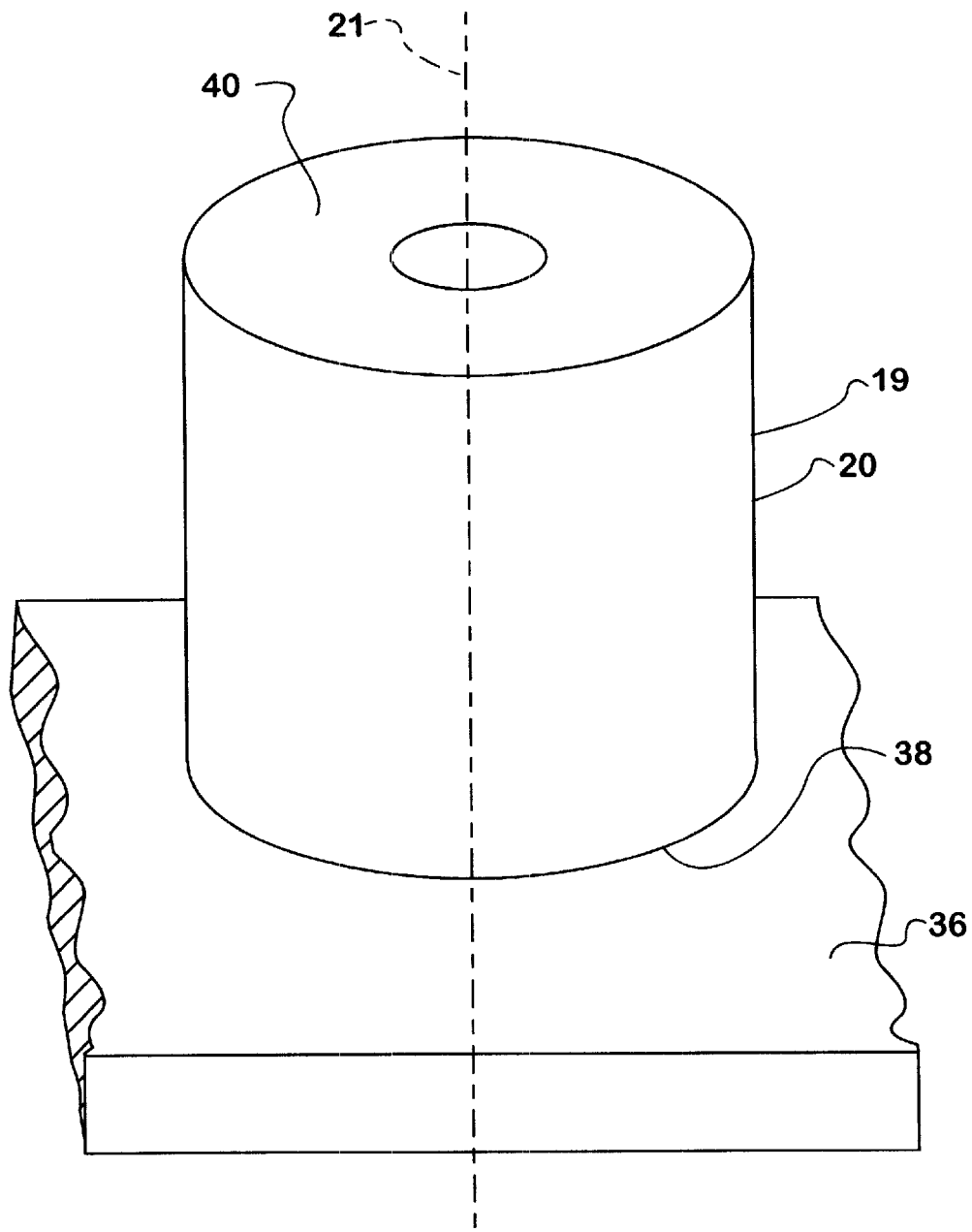
FIG. 2 is a perspective view of an unreinforced elastomer block spring/damper component mounted to a spring/damper mounting component.
Figure 3:
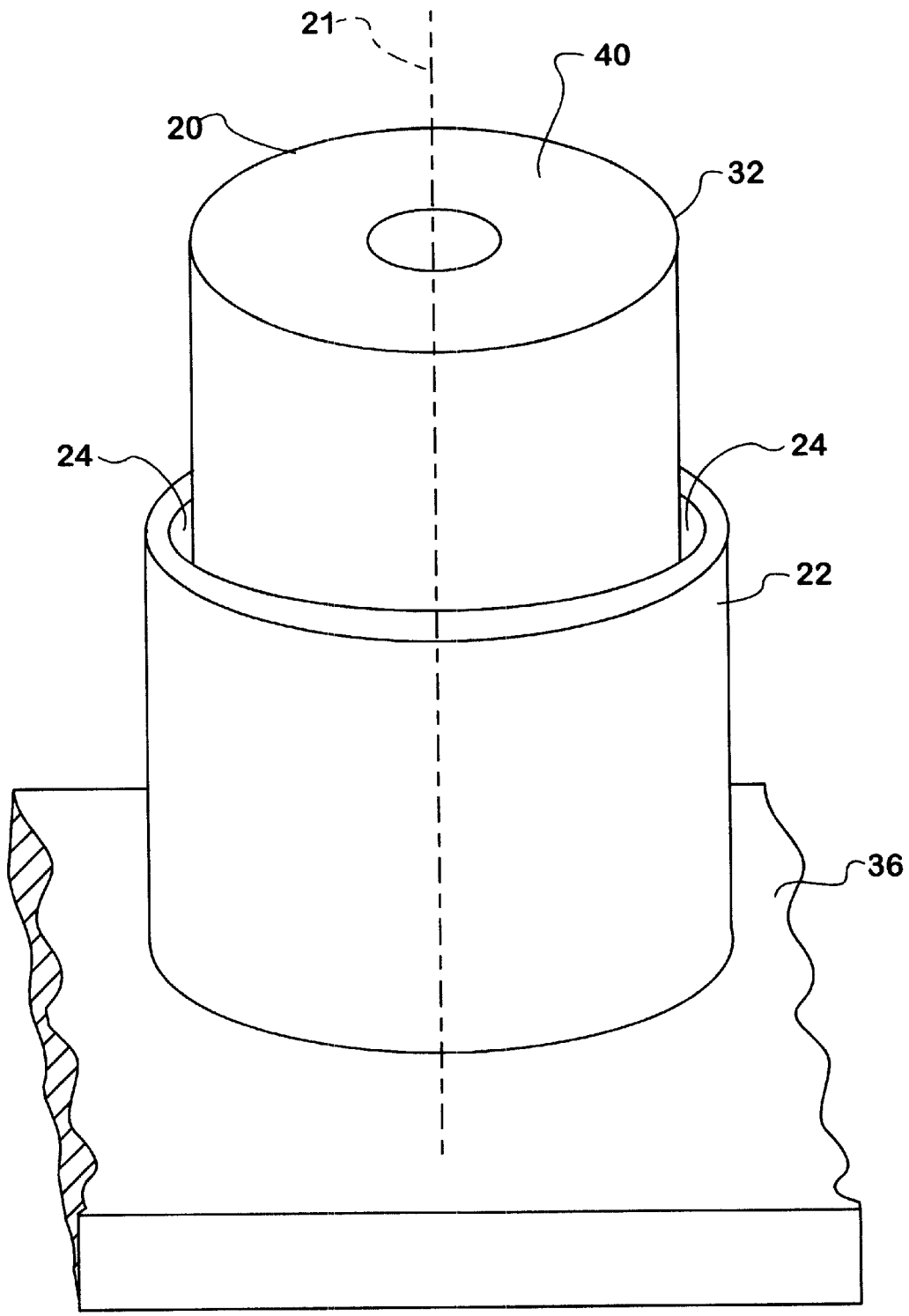
FIG. 3 is a perspective view of one embodiment of a two stage reinforced elastomer block spring/damper component mounted to a spring/damper mounting component.
Figure 4:
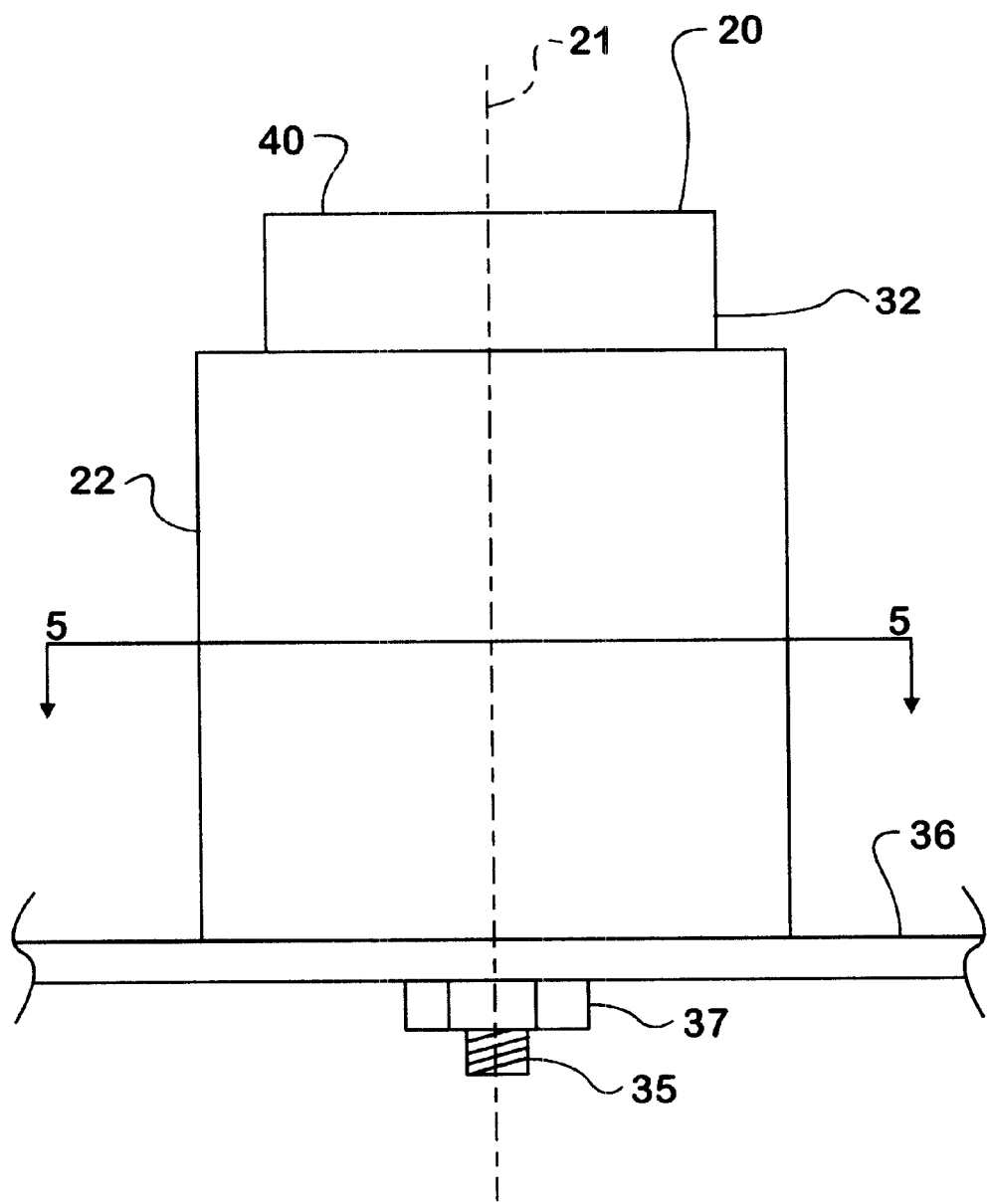
FIG. 4 is a side elevational view of a two stage reinforced elastomer block spring/damper component engaged to a spring/damper mounting component.
Figure 5:
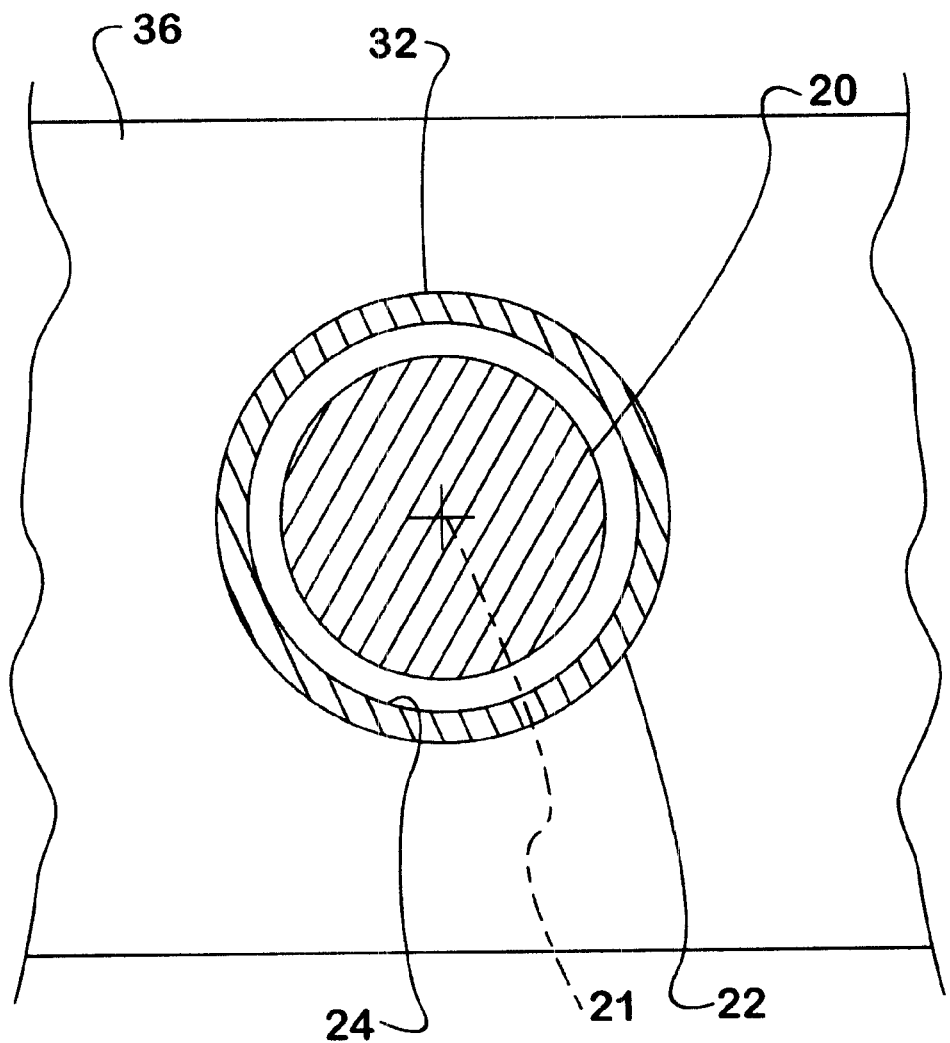
FIG. 5 is a sectional view through line 5—5 of the two stage reinforced elastomer block spring/damper component shown in FIG. 4.

The vehicle body suspension system 17 of the present invention includes one or more spring/damper components 18, 19, 32. The purpose of the spring/damper components 18, 19, 32 of the vehicle body suspension system 17 is to resist relative motion between the body structure 16 and the chassis 11 of, the vehicle 10 under certain conditions in order to moderate/and or limit the relative motions and accelerations between the body structure 16 and the chassis 11. The vehicle body suspension system 17 of the present invention includes one or more spring/damper components 19, 32 that are elastomer block spring/damper components 19, 32. Such an elastomer block spring/damper component 19 is shown in FIG. 2. An elastomer block spring/damper component 19, 32 comprises an elastomer body 20 that is a block of elastomer material. The block of elastomer material that forms the elastomer body 20 of an elastomer block spring/damper component 19, 32 may have any of a number of shapes. As is well known, elastomer block spring/damper components 19, 32 are intended to be utilized in situations where their elastomer body 20 will be compressed between two components and, thus, resist further relative motion of the components in such a direction that the elastomer body 20 is further compressed. The elastomer body 20 off such elastomer block spring/damper components 19, 32 has a compression axis 21, in directions parallel to which, the elastomer body 20 is well suited to be compressed. The cross-sections of the elastomer, body 20 perpendicular to its compression axis 21 have a high enough resistance to bending that the elastomer body 20 can be subjected to very high compression loads without buckling. In other words, most cross-sections of the elastomer body 20 in directions perpendicular to its compression axis 21 have a width that is a relatively substantial percentage of the length of the elastomer body 20 in directions parallel to its compression axis 21. When the elastomer body 21 of such an elastomer block spring/damper component 19, 32 is compressed in directions parallel to its compression axis 21 the elastomer body 20 expands outwardly in direction perpendicular to the compression axis 21. If the elastomer body 20 is compressed in such a manner to a great enough extent tensile forces in its outer surfaces will eventually become great enough to cause the elastomer body 20 to rupture.

The vehicle body suspension system 17 of the present invention is constructed in such a manner that each of its elastomer block spring/damper components 19, 32 is compressed between components that are engaged to the suspended body structure 12 and components that are engaged to the chassis 11 in certain circumstances. The construction of the vehicle body suspension system 17 of the present invention may be such that each of the elastomer block spring/damper components 19, 32 is compressed between components engaged to the body structure 12 and components engaged to the chassis 11 at all times. Alternatively the construction of the vehicle body suspension system 17 of the present invention may be such that each of the elastomer block spring/damper components 19, 32 is compressed between components engaged to the body structure 12 and components engaged to the chassis 11 only when the body structure 12 and the chassis 11 are in certain, relative positions. A vehicle body suspension system 17 may also be constructed in such a manner that some of its elastomer block spring/damper components 19, 32 are always in compression while others of its elastomer block spring/damper components are in compression only when the body structure 12 and the chassis 11 are in certain relative positions.

One or more of the elastomer block spring/damper components 19, 32 of the vehicle body suspension system 17 of the present invention are reinforced elastomer block spring/damper components 32. Such a reinforced elastomer block spring/damper component 32 is illustrated in FIGS. 3, 4, 5, 6a, and 6b. Such a reinforced elastomer block spring/damper component 32 includes a reinforcing wall 22 that surrounds at least a portion of the elastomer body 20 of each reinforced elastomer block spring/damper component 32. As was mentioned above, when the elastomer body 20 of such a reinforced elastomer block spring/damper component 32 is compressed in directions parallel to its compression axis 21 it expands outwardly in directions perpendicular to its compression axis 21. When the elastomer body 20 is compressed and expands outwardly in such a manner the portion of the elastomer body 20 that is surrounded by the reinforcing wall 22, eventually contacts an inner surface 24 of the reinforcing wall 22. After the elastomer body 20 contacts the reinforcing wall 22 in such a manner, application of increasingly greater compression forces to the elastomer body 20 causes the elastomer body 20 to, exert increasing outward forces upon the reinforcing wall 22 and the reinforcing, wall 22 to exert increasingly greater compressive forces upon the elastomer body 20. Because the reinforcing wall 22 exerts such compressive forces upon the elastomer body 20 in such a situation, the tensile forces in the outer surfaces of the portion of the elastomer body 20 disposed within the reinforcing wall 22 will never become great enough to cause rupture of that portion of the elastomer body 20. Thus, the portion of the elastomer body 20 of a reinforced elastomer block spring/damper component 32 that is disposed within the reinforcing wall 22 can withstand considerably greater compressive loads than an elastomer body 20 of an elastomer block spring damper component 19 that, has no reinforcing wall 22. Thus, the reinforced elastomer block spring/damper components 32 of the vehicle body suspension system 17 of the present. invention have considerably greater durability than elastomer block spring/damper components 19 that have no reinforcing wall 22. Construction of the vehicle body suspension system 17 with spring/damper components 18, 19, 32 that have superior durability has obvious advantages. Additionally, when a portion of the elastomer body 20 of a reinforced elastomer block spring/damper component 32 is in contact with inner surfaces 24 of a reinforcing wall 22, that portion of the elastomer body 20 has a very high stiffness against compression in directions parallel to the compression axis 21 of the elastomer body 20. In fact a portion of an elastomer body 20 that is in contact with inner surfaces 24 of a reinforcing wall 22 in such a manner generally has a compression stiffness that is many times greater than the compression stiffness of a similar portion of elastomer body 20 that is not in contact with a reinforcing wall 22. There are certain circumstances in which the relatively high compression stiffness that can be provided by a reinforced elastomer block spring/damper component 32 can be utilized within a vehicle body suspension system 17 with a resulting realization of great benefits. The circumstances in which it is particularly beneficial to utilize a reinforced elastomer block spring/damper component 32 because of its relatively high compression stiffness are discussed in greater detail below. A reinforced elastomer block spring/damper component 32 according to the present invention is constructed in such a manner that one or more cross-sections of the elastomer body 20 perpendicular to its compression axis 21 are completely surrounded by the reinforcing wall 22. The reinforcing wall 22 is constructed of a material that is very rigid as compared to the elastomer material that the elastomer body 20 is constructed of. There are many different materials that would be suitable for the construction of the reinforcing wall 22 including many different types of metals including steel and aluminum.

A reinforced elastomer block spring/damper component 32 and the other components of the vehicle body suspension system 17 may be constructed and engaged to one another in a number of different ways according to the present invention. The elastomer body 20 of a reinforced elastomer block spring/damper component 32 of a vehicle body suspension system 17 according to the present invention has a mounting end 38 that is in a fixed position relative to a spring/damper mounting component 36 to which the elastomer body 20 is mounted. The elastomer body 20 of each reinforced elastomer block spring/damper components 32 of a vehicle body suspension 17 according to the present invention must also be in such a position that a compression end 40 of the elastomer body 20 is disposed within a path of travel of a compression component 39 of the vehicle body suspension 17. The compression end 40 of an elastomer body 20 is an end of the elastomer body 20 that is disposed opposite the mounting end 38 of the elastomer body 20. Each spring/damper mounting component 32 is engaged to either the chassis 11. or the suspended body structure 12 of the vehicle 10 and a complimentary compression component 39 is engaged to whichever of the chassis 11 and the suspended body structure 12 the complimentary spring/damper mounting component 36 is not engaged to. Thus, the elastomer body 20 of each reinforced elastomer block spring/damper component 32 will be compressed between a respective complimentary set of a spring/damper mounting component 36 and a compression component 39 of the vehicle body suspension 17, when the chassis 11 and the suspended body component 12 are in certain relative positions. The reinforcing wall 22 of each of the reinforced elastomer block spring/damper components 32 must also be engaged to the vehicle body suspension 17 in such a manner that its position is fixed relative to a respective spring/damper mounting component 36 to which the elastomer body 20 is mounted. One embodiment of a reinforced elastomer block spring/damper component 32 that is constructed and engaged to a spring/damper mounting component 36 in such a manner is shown in FIGS. 3, 4, 5, 6a, , and 6b. The reinforced elastomer block spring/damper component 32 shown in these figures comprises, a threaded fastener component 35, one end of which is embedded within the elastomer body 20. The threaded fastener component 35 shown in the figures extends from the end that is embedded in the elastomer body 20 out of the elastomer body 20 in a direction parallel to the compression axis 21 of the elastomer body 20. A portion of the threaded fastener component 35 disposed outside the elastomer body 20 extends through a hole in a portion of a spring/damper mounting component 36 to which the reinforced elastomer block spring/damper component 32 is mounted. In the embodiment shown in the figures an end of the fastener component 35, that is disposed upon a side of the spring/damper mounting component 36 opposite the end of the fastener component 35 that is embedded within the elastomer body 20, is threadedly engaged to a nut 37. Thus, the figures depict an elastomer body 20 that is attached to the spring/damper mounting component 36 as a result of the threaded engagement of the threaded fastener component 35 to the nut 37. The elastomer body 20 of a reinforced elastomer block spring/damper component 32 may also be mounted to a spring/damper mounting component 36 of a vehicle body suspension; system 17 with adhesives. The elastomer body 20 of a reinforced elastomer block spring/damper component 32 may also be held in such a position that its mounting end 38 is fixed relative to a spring/damper component 36 as a result of the elastomer body 20 being compressed between a respective compression component 39 and the spring/damper mounting component 36. As is depicted in the figures the reinforcing wall 22 of a reinforced elastomer block spring/damper component 32 may be directly engaged to the spring/damper mounting component 36 to which the elastomer body 20 of the reinforced elastomer block spring/damper component 32 is mounted. The reinforcing wall 22 may be engaged to the spring/damper mounting component 36 by welding, by fasteners or as a result of being integrally formed with the spring/damper mounting component 36. Alternative to the embodiment that is shown in the figures a given reinforced elastomer block spring/damper component 32 may be constructed in such a manner that its elastomer body 20 and its reinforcing wall 22 are more directly attached to one another and can be mounted to or separated from a spring/damper mounting component 36 as a unit.

Figure 10:
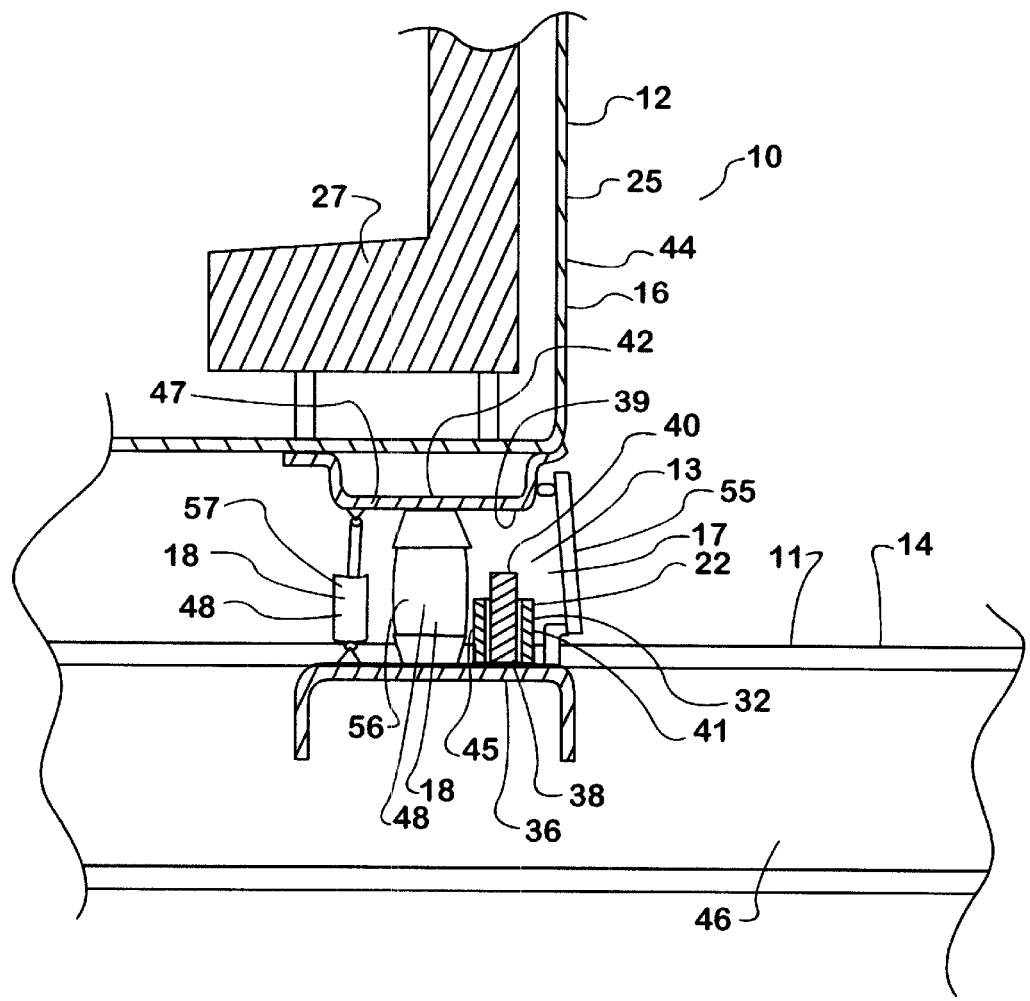
FIG. 10 is a sectional view through line 10—10 of FIG. 9 showing a portion of the vehicle body suspension system 17 that supports a rear portion of the suspended body structure.

The body structure 12 that is supported by the vehicle body suspension system 17 of the present invention may be any of a number of different types of body structures 12. The body structure 12, may for instance, be, any of a number of different types of cargo bodies that it is known to use on vehicles 10. The body structure 12 may also be an operator cabin 25 from which an operator of the vehicle 10 can control the operation of the vehicle 10. Operator cabins 25 of vehicles 10 are well known. An operator cabin 25 according to the present invention may have any of a great number of constructions but all operator cabins 25 according to the present invention have some characteristics in common. An operator cabin 25 according to the present invention has a platform 26 upon which an operator of the vehicle 10 may stand while operating the vehicle 10 and/or a seat 27 upon which an operator of the vehicle 10 may sit while operating the vehicle 10. An operator cabin 25 according to the present invention has all controls 28 necessary to control the operation of the vehicle 10 in a majority of circumstances disposed within the operator cabin 25 at positions such that an operator seated on the seat 27 or standing upon the platform 26 of the operator cabin 25 may operate the controls 28 in order to control the operation of the vehicle 10. For instance, the vehicle shown in FIG. 1 is a truck that has an operator cabin 25 with a seat 27 upon which an operator of ;the vehicle 10 may sit and operate all of the controls 28 necessary to operate the vehicle 10 in a majority of situations. The operator cabin 25 of the vehicle shown in FIG. 10 also has disposed within it all of the controls 28 necessary to operate the vehicle 10 in a majority of circumstances. In FIG. 1 some, but not all of the controls 28 that are located within the operator cabin 25 are illustrated and include a steering wheel 29, control pedals 30, and a gear shift 31. All of the controls 28 illustrated within the operator cabin 25 of the vehicle 10 of FIG. 1 is also obviously located in such a position that an operator seated upon the seat 27 of the operator cabin 25 could operate them in order to control the operation of the vehicle 10. Such an operator cabin 25 may further include windshield glass that isolates the operator from impending airflow across the front of the vehicle 10 as the vehicle travels at speed and through which the operator can view the environment disposed in front of the vehicle 10. Such an operator cabin 25 may also define one or more door openings 58 through which an operator can enter the operator cabin 25 and one or more swingable doors 59 that can be selectively opened or closed to cover or expose the one or more door openings of the operator cabin 25. As is alluded to above some of the controls 28 of the vehicle 10 that are used in certain circumstances may be located outside of the operator cabin 25. For instance some of the controls 28 for an auxiliary component of the vehicle 10 such as a dump body may be located outside of the operator cabin 25 as these controls 28 are only used to control operation of the vehicle 10 in a minority of circumstances. Utilization of a vehicle body suspension system 17 that includes reinforced elastomer block spring/damper components 32 to support an operator cabin 25 is particularly beneficial because the beneficial isolating properties of such a vehicle body suspension system 17 can result in increased operator comfort.

Figure 6A:
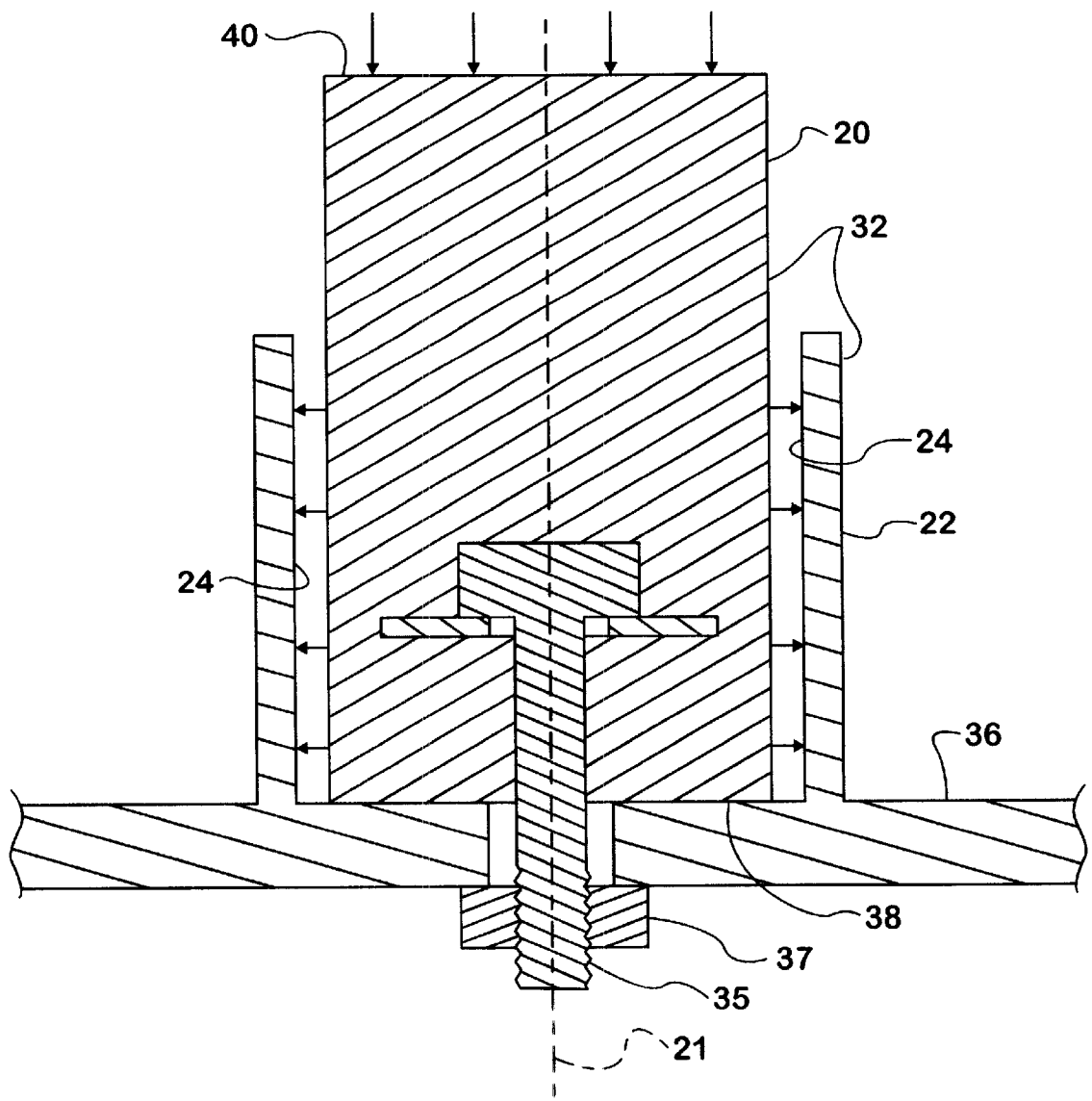
FIG. 6a is a sectional view of a two stage elastomer block spring/damper component in its first stage of compression.
Figure 6B:
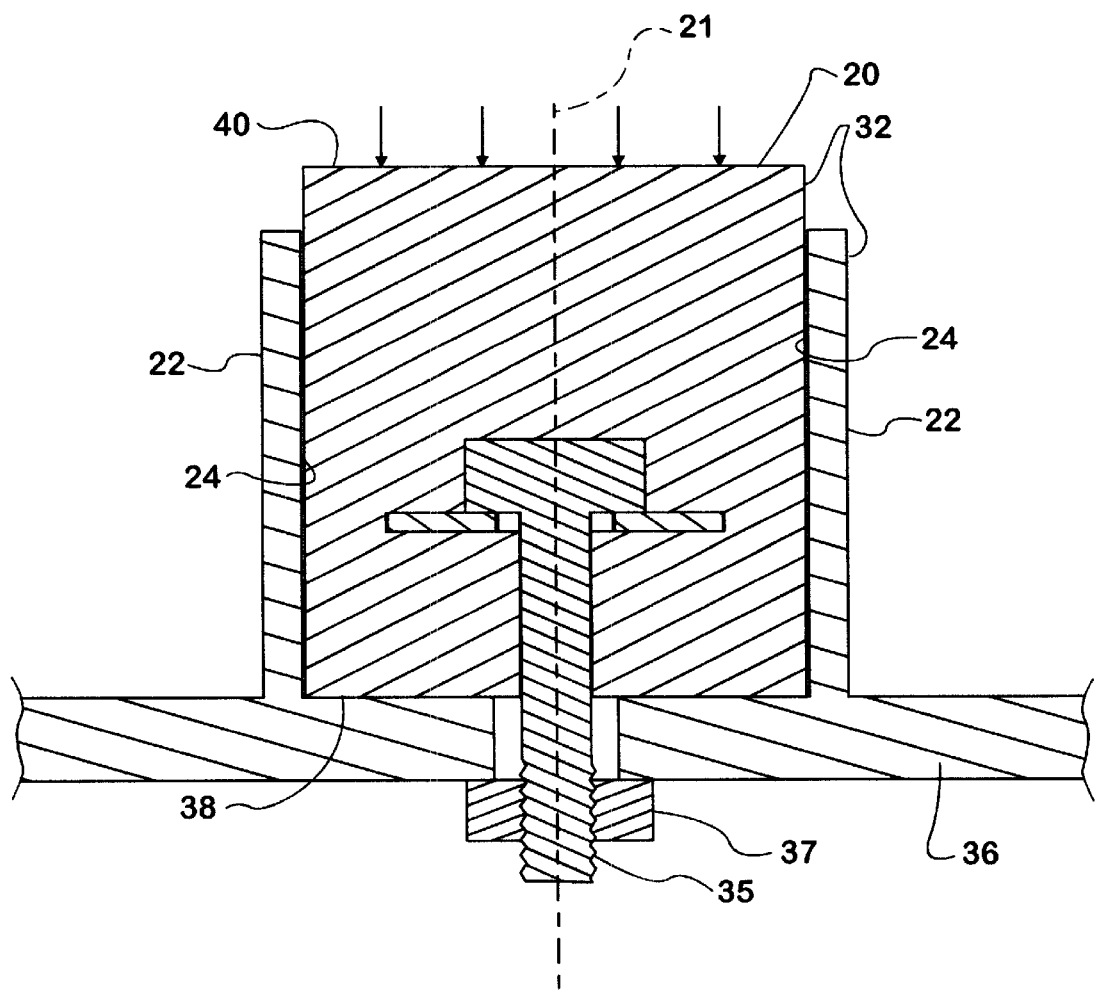
FIG. 6b is a sectional view of a two stage elastomer block spring/damper component in its second stage of compression.

One or more of the reinforced elastomer block spring/damper components 32 of the vehicle body suspension system 17 of the present invention may be constructed in such a manner that there is a gap between its elastomer body 20 and its reinforcing wall 22 when the elastomer body 20 is in its free state. Such a reinforced elastomer block spring/damper component 32 is shown in FIGS. 3, 4, 5, 6a, and 6b. Such a reinforced elastomer block spring/damper component 32 that has a gap between its elastomer body 20 and its reinforcing wall 22 has two stages of compression within which it may exist. Such a reinforced elastomer block spring/damper component 32 has a relatively low compression stiffness in its first stage of compression which occurs until the elastomer body 20 expands outwardly to an extent that it contacts inner surfaces 24 of its reinforcing wall 22. Once the elastomer body 20 of such a reinforced elastomer block spring/damper component 32 is compressed to an extent such that its outer surfaces contact inner surfaces 24 of the reinforcing wall 22, it is in its second stage of compression and its compression stiffness becomes very high. Such elastomer block spring/damper components 32 that have a gap between there elastomer body 20 and inner surfaces 24 of their reinforcing wall 22, will herein after be referred to as two stage reinforced elastomer spring/damper components 32 because of the two stages of compression within which they may exist. Successive steps in a process of compressing such a two stage reinforced elastomer block spring/damper component 32 until outer surfaces of its elastomer body 20 are in contact with inner surfaces 24 of its reinforcing wall 22 are shown in FIGS. 6a and 6b. The mechanical characteristics of such a two stage reinforced elastomer block spring/damper component 32 are affected by, in addition to many other factors, the size of the gap between the elastomer body 20 and the reinforcing wall 22 and the percentage of the elastomer body 20 that is surrounded by the reinforcing wall 22. Different values of these parameters of a two stage reinforced elastomer block spring/damper component 32 would be most appropriate for different applications. Generally, the higher the percentage of an elastomer body 20 is surrounded by a reinforcing wall 22, the higher the compression stiffness of the two stage elastomer block spring/damper component 32 will be in its second compression stage. It is also true that the gap between the elastomer body 20 and the reinforcing wall 22 of a two stage reinforced elastomer block spring/damper component 32 should be small enough that, during compression, the elastomer body 20 will expand outwardly to an extent that it contacts the reinforcing wall 22 before the elastomer body ruptures. An individual of ordinary skill in the art could easily determine based upon the geometry and material properties of an elastomer body 20 how big this gap can be without the elastomer body 20 rupturing before it contacts the reinforcing wall 22.

Figure 7:
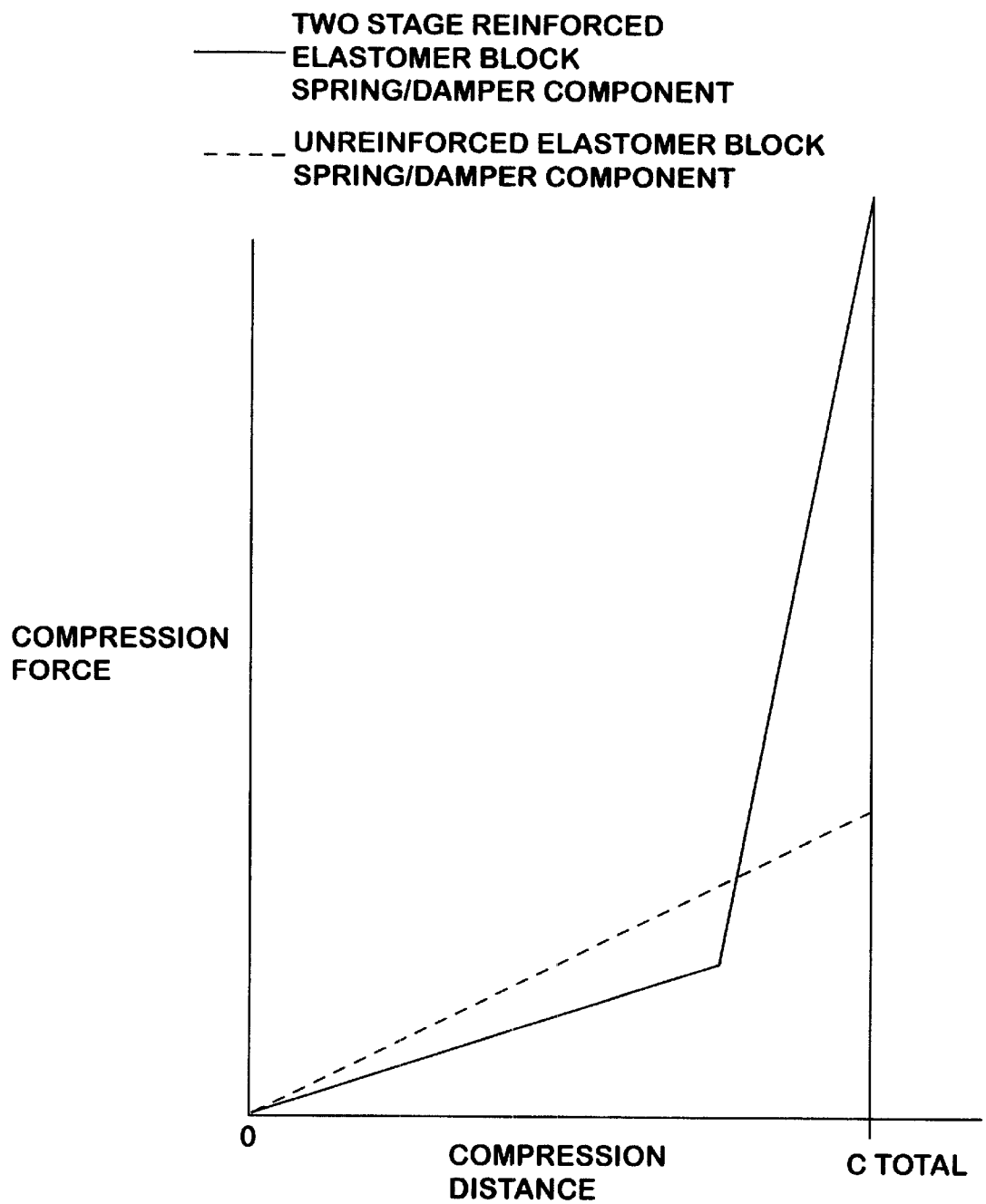
FIG. 7 is a graphical representation of the compression characteristics of an unreinforced elastomer block spring/damper component and also the compression characteristics of a two stage reinforced elastomer block spring/damper component.
Figure 8:
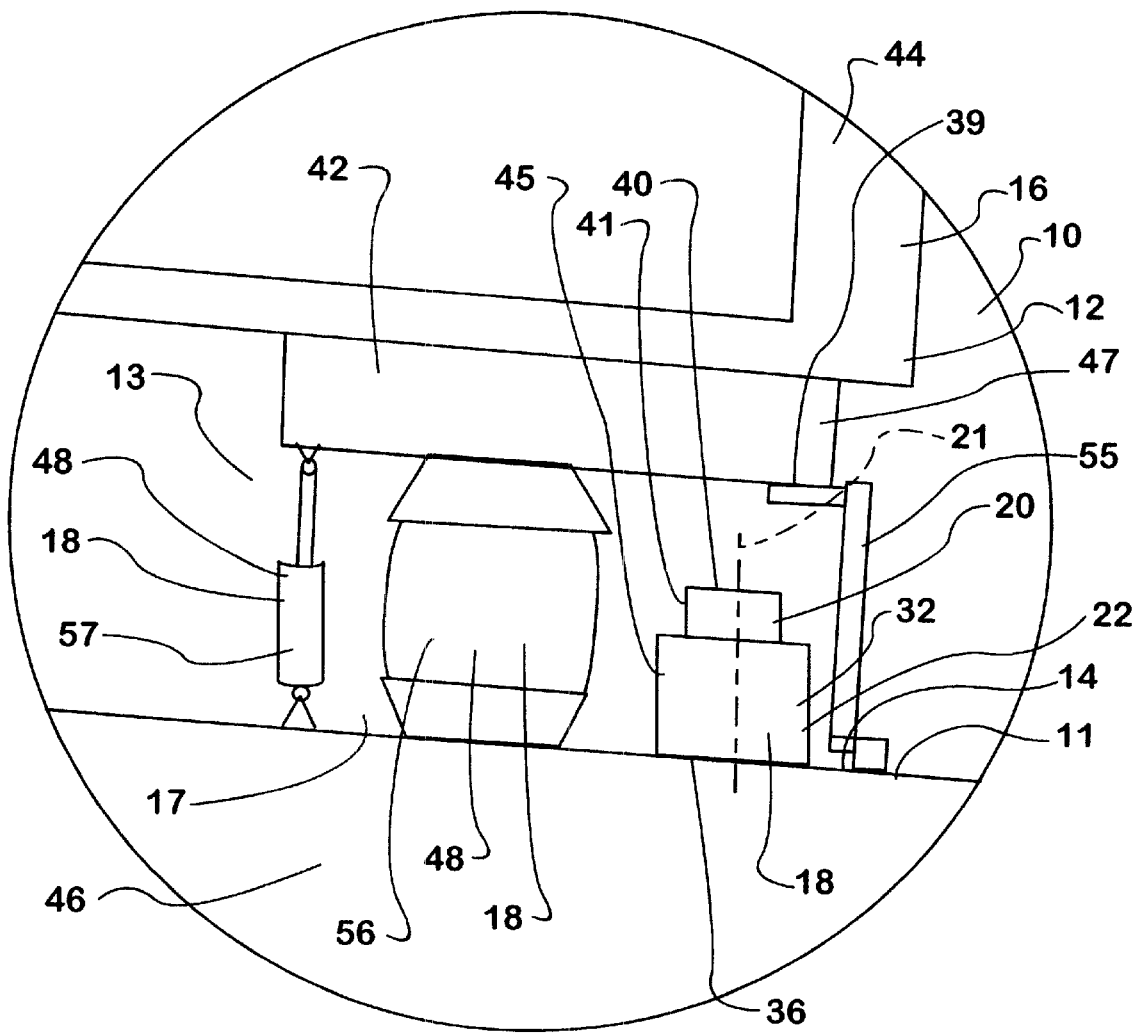
FIG. 8 is an expanded view of the portion of FIG. 1 shown in circle 8 showing a portion of the vehicle body suspension system that supports the rear portion of the suspended body structure.
Figure 9:
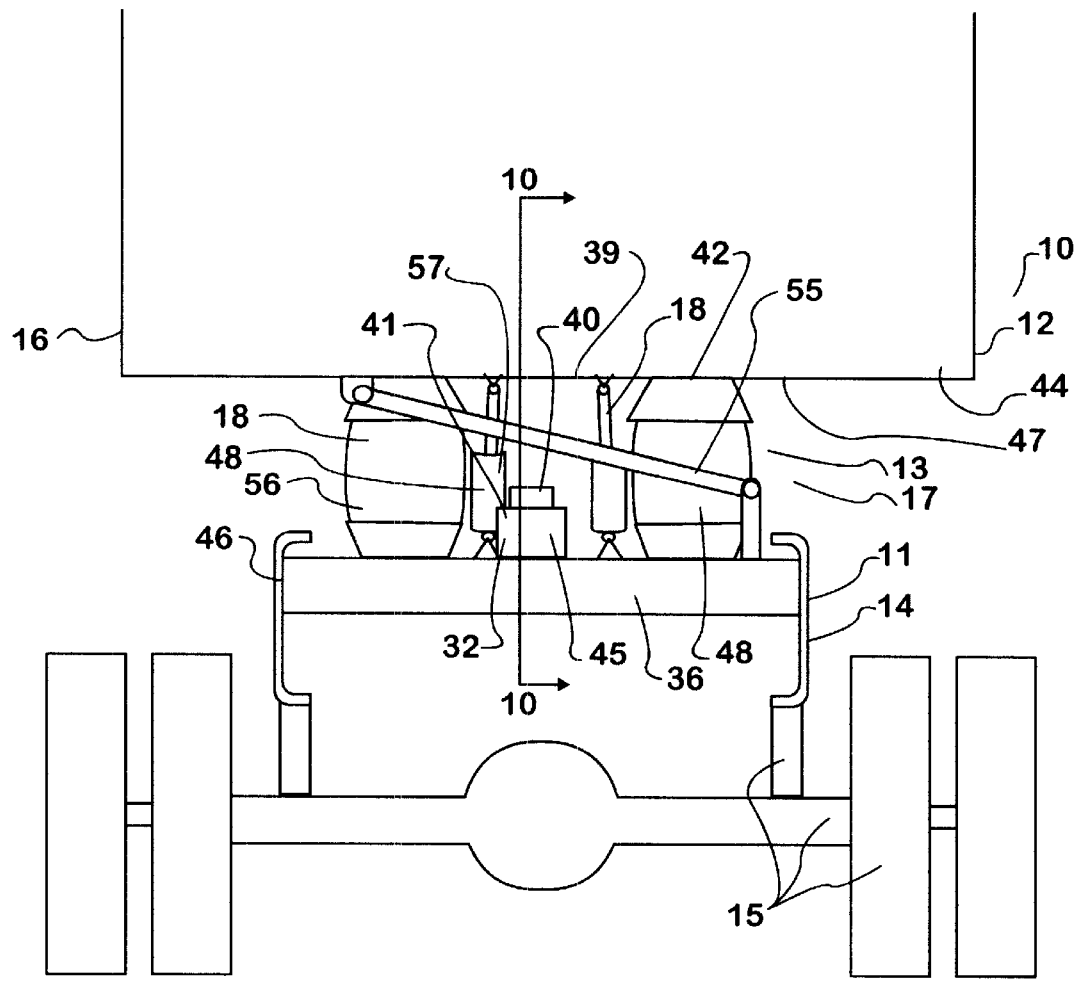
FIG. 9 is rear view of the frame ladder portion of the chassis, the vehicle body suspension system,, and the suspended body structure of the vehicle shown in FIG. 1.

Such a two stage reinforced elastomer block spring/damper component 32 can be utilized within a vehicle body suspension system 17 with considerable benefit. The elastomer block spring/damper components 19, 32 of a vehicle body suspension system 17 are generally constructed to absorb a certain amount of energy through a certain compression distance. A two stage reinforced elastomer block spring/damper component 32 may be constructed in such a manner that it is capable of absorbing a same amount of energy through a same compression distance as a comparable unreinforced elastomer block spring/damper component 19. A two stage reinforced elastomer block spring/damper component 32 designed in such a manner to absorb a same amount of energy as an unreinforced elastomer block spring/damper component 19 will have a compression stiffness in its first stage of compression that is considerably less than the compression stiffness of the unreinforced elastomer block spring/damper component 19. As an example, FIG. 7 graphically represents the compression force versus compression distance for both an unreinforced elastomer block spring/damper component 19 and a two stage elastomer block spring/damper component 32. An equal amount of energy is required to compress each of the elastomer block spring/damper components whose compression characteristics are represented in FIG. 7 to a compression distance of $C_{total}$. Thus, the elastomer block spring/damper components whose compression characteristics are illustrated in FIG. 7 could be utilized in similar applications within a vehicle body suspension system 17 where an important characteristic of a spring/damper component is the total energy that it can absorb through a given compression distance. In many applications where it would be suitable to utilize either of the elastomer block spring/damper components whose compression characteristics are graphically represented in FIG. 7 in a vehicle body suspension system 17, it is preferable to utilize the two stage elastomer block spring/damper component 32. Because of its lower initial compression stiffness it would generally be preferrable to utilize the two stage elastomer block spring/damper component 32 in a vehicle body suspension system 17 instead of the unreinforced elastomer block spring/damper component 19. A vehicle body suspension system 17 that utilizes two stage elastomer block spring/damper components 32, as opposed to unreinforced elastomer block spring/damper components 19, will generally accelerate the suspended body structure 12 in a relatively gentle manner when the vehicle 10 travels over relatively minor disturbances.

The vehicle body suspension system 17 of the present invention may be constructed in such a manner that one or more of its reinforced elastomer block spring/damper components 32 act as bump stops 41. As is well known, bump stops 41 of a vehicle body suspension system 17 act to define the outer limits of the relative positions that the suspended body structure 12 and the chassis of a vehicle 11 may occupy in certain directions. A bump stop 41 of a vehicle body suspension system 17 according to the present invention is mounted to a spring/damper mounting component 36 and is disposed between the spring/damper mounting component 36 and a corresponding compression component 39. For purposes of this disclosure a suspended body structure 12 is considered to be in a neutral position relative to the chassis 11 it is supported upon, when the vehicle 10 is at rest, the suspended body structure 12 and all of the contents and systems of the suspended body structure 12 are at rest, and the suspended body structure 12 is not abnormally heavily loaded. A vehicle body suspension system 17, according to the present invention is constructed in such a manner that, when the suspended body structure 12 of the vehicle 10 is in its neutral position, there is a space present between each bump stop 41 of the vehicle body suspension system 17 and a corresponding compression component 39. When a vehicle 10 according to the present invention travels over uneven surfaces the suspended body structure 12 and the chassis 11 will move relative to one another in such a manner that the suspended body structure 12 oscillates around its neutral position. As the suspended body structure 12 oscillates around its neutral position the gap between each of the bump stops 41 and a corresponding compression component 39 of the vehicle body suspension system 17 increases and decreases. If the suspended body structure 12 of the vehicle 10 moves far enough away from its neutral position the gap between one or more bump stops 41 and corresponding compression components 39 may cease to exist as the compression component(s) 39 contact the bump stop(s) 41. Once a given compression component 39 is in contact with a bump stop 41, further movement of the compression component 39 toward the bump stop 41 results in rapidly increasing forces between the bump stop 41 and the compression component 39. Thus, once a compression component 39 is in contact with a corresponding bump stop 41 further movement of the compression component 39 toward the bump stop 41 is limited to a very small magnitude. Thus, the bump stop 41 serves its purpose which is to limit the distance that the suspended body structure 12 can travel away from its neutral position in a certain direction. In some circumstances a bump stop 41 of a vehicle body suspension system 17 is compressed with very high amounts of force between the spring/damper mounting component 36 to which it is mounted and a corresponding compression component 39. Because bump stops 41 are subjected to such high compression forces the spring/damper mounting component 36 the a bump stop 41 is mounted to, the corresponding compression component 39, and the structure that these two components are mounted to need to be of a relatively strong construction. Also because bump stops 41 are subjected to such high compression loads, reinforced elastomer block spring/damper components 32 and two stage reinforced elastomer block spring/damper components 32 are well suited for use as bump stops 41 in vehicle body suspension systems 17. Reinforced elastomer block spring/damper components 32 and two stage reinforced elastomer block spring/damper components 32 are substantially less likely to rupture, under the high compressive loads that bump stops 41 are subjected to than are unreinforced elastomer block spring/damper components 19. This is particularly important because, in some applications, if a bump stop ruptures the suspended body structure 12 may move outside of its intended range of relative positions to the chassis 11 and components of the vehicle 10 may undesirably collide and damage one another. A bump stop 41 that comprises a reinforced elastomer block spring/damper component 32 or a two stage reinforced elastomer block spring/damper component 32 has substantial advantages as compared to a bump stop 41 that comprises an unreinforced elastomer block spring/damper component 19. A bump stop 41 that comprises either type of reinforced elastomer block spring/damper component 32 is capable of absorbing a given amount of energy in a shorter compression distance than a bump stop 41 that comprises a similarly sized unreinforced elastomer block spring/damper component 19. A vehicle body suspension system 17 that utilizes bump stops 41 that require less compression distance Scan be designed with more suspension travel of the suspended body component 12 before it contacts a bump stop 41, and thus with lower spring rates of primary spring/damper components 48 of the vehicle body suspension system 17.

Figure 11:
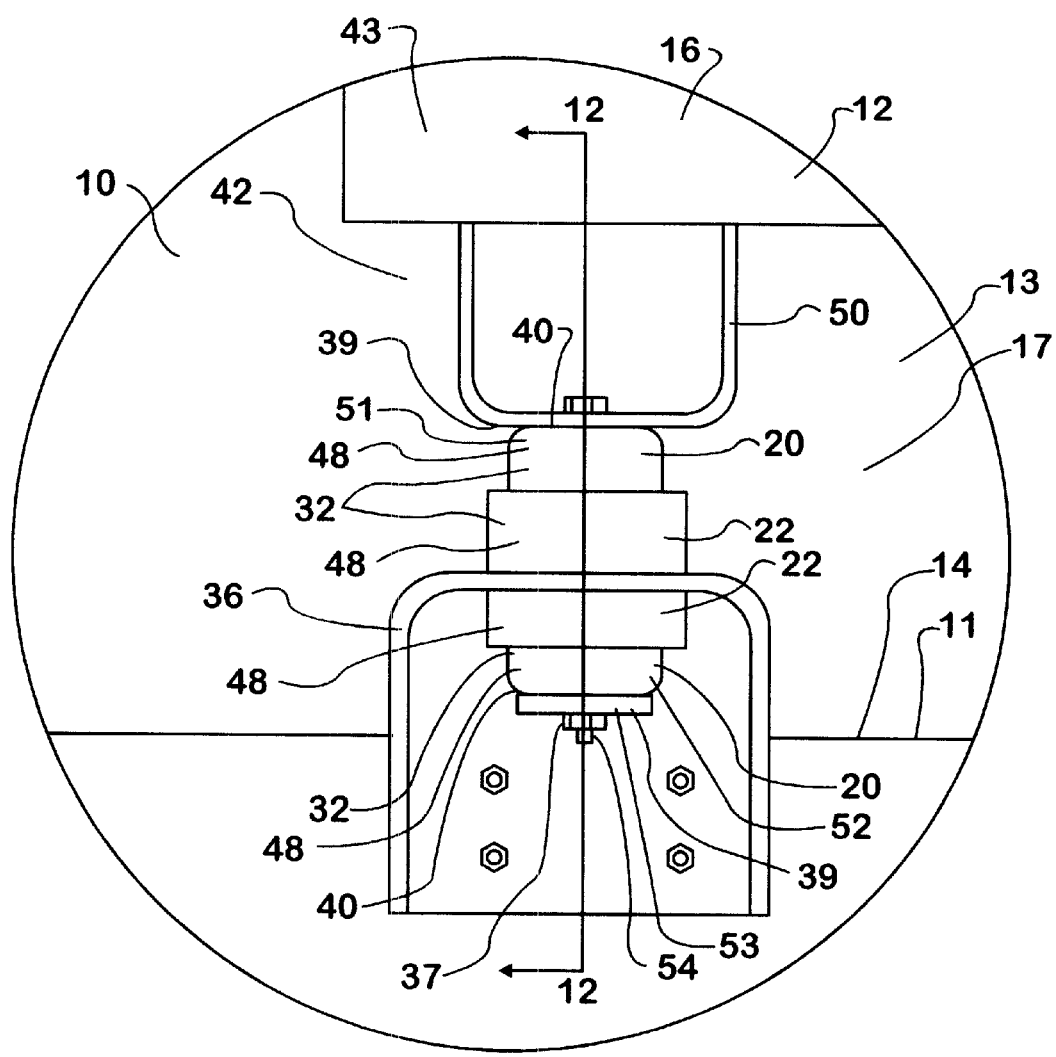
FIG. 11 is an expanded view of the portion of FIG. 1 shown in circle 11, which shows in detail a portion of the vehicle body suspension system that supports a front portion of the suspended body structure.
Figure 12:
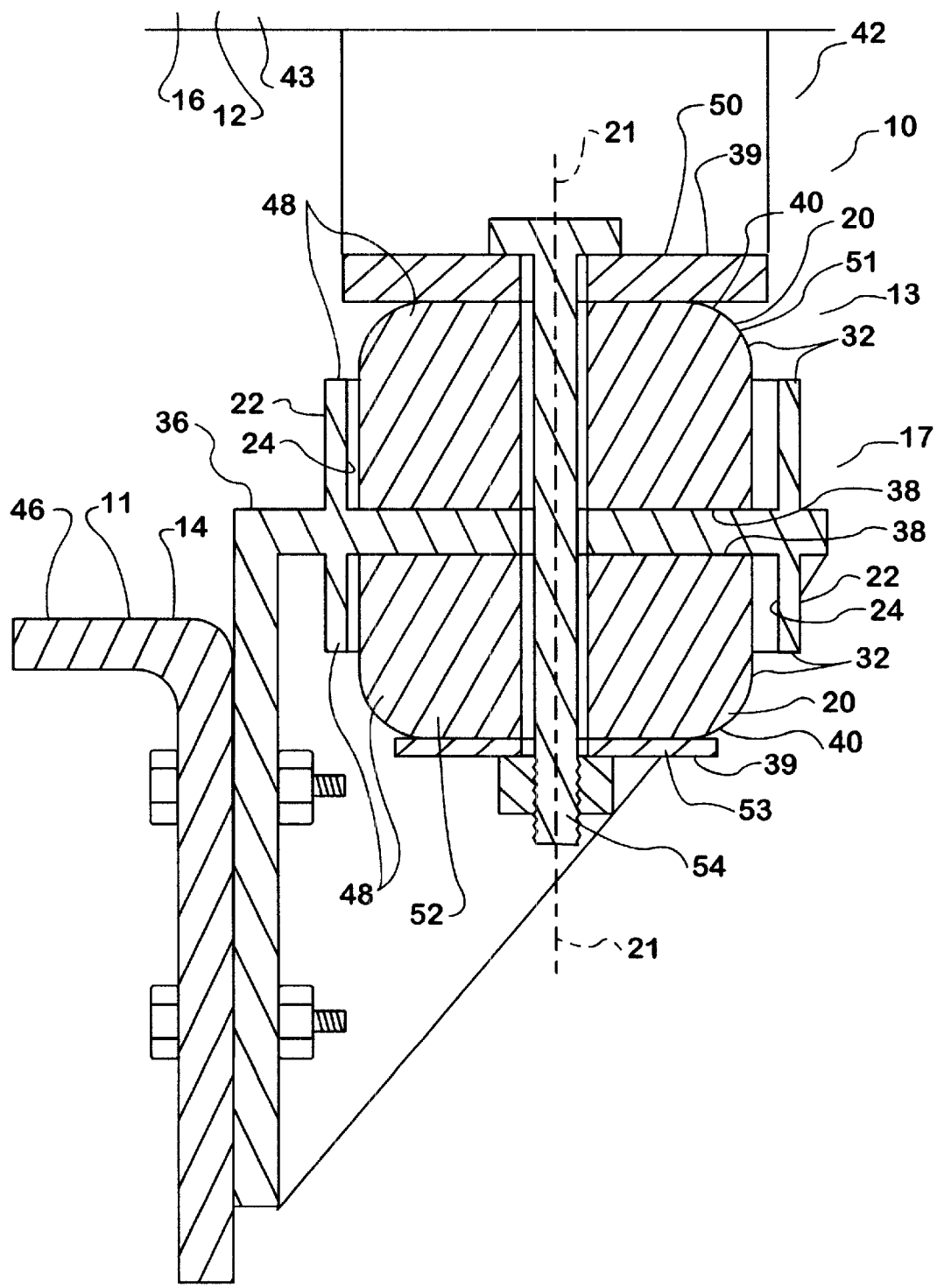
FIG. 12 is a sectional view through line 12—12 of FIG. 11 showing a portion of the vehicle body suspension system that supports the front portion of the suspended body structure.

A vehicle body suspension system 17 according to the present invention may include one or more reinforced elastomer block spring/damper components 32 that function as primary spring/damper components 48 of the vehicle body suspension system 17. In contrast to the functionality of a bump stop 41 a primary spring/damper component 48 of a vehicle body suspension system 17 acts to resist relative motion between the suspended body structure 12 and the chassis 11 in certain directions when they are in relative positions within their intended range of relative positions. Generally a reinforced elastomer block spring/damper component 32 that is a primary spring/damper component 48 of a vehicle body suspension system 17 is disposed between and is in contact with a complimentary spring/damper mounting component 36 and compression component 39, when the suspended body structure 12 is in its neutral position. An example of such a construction of a vehicle body suspension system 17 is shown in FIGS. 1, 11, and 12. In these figures the suspended body structure 12 of the vehicle 10 is in its neutral position relative to the chassis of the vehicle 10. In these figures is shown a vehicle body suspension system 17 that is engaged to the suspended body structure 12 at a front mounting point 49 adjacent the front portion 43 of the body structure 12. The vehicle body suspension system 17 shown in these figures includes two two stage reinforced elastomer block spring/damper components 32 mounted to the vehicle body suspension system 17 near the mounting point 49 of the suspended body structure 12 to the vehicle body suspension system 17. An upper two stage reinforced elastomer block spring/damper component 51 that is engaged to the vehicle body suspension system 17 with a mounting end 38 of its elastomer body 20 disposed adjacent a spring/damper mounting component 36 and the elastomer body 20 extending upwardly from the spring/damper component 36. A lower two stage reinforced elastomer block spring/damper components 52 is engaged to the vehicle body suspension system 17 with a mounting end 38 of its elastomer body 20 disposed adjacent a spring/damper mounting component 36 and the elastomer body 20 extending downwardly from the spring/damper component 36. The reinforcing wall 22 of each of these two stage reinforced elastomer block spring/damper components 32 is engaged to the spring/damper mounting component 36 adjacent which the elastomer bodies 20 of the two stage reinforced elastomer block spring/damper components 32 are disposed. An upper compression component 50 is engaged to the suspended body structure 12 and also rests upon a compression end 40 of the elastomer body 20 of the upper two stage reinforced elastomer block spring/damper component 32. Thus, the portion of the suspended body structure 12 to which the upper compression component 50 is engaged derives support from the upper compression component 50, which derives support from the upper two stage reinforced elastomer block spring/damper component 32, which derives support from, the spring/damper mounting component 36 which derives support from the chassis 11. It can also be seen that the upper two stage reinforced elastomer block spring/damper component 51 resists virtually any movement of the suspended body structure 12 away from its neutral position and toward the chassis 11. A lower compression component 53 is disposed adjacent the compression end 40 of the elastomer body 20 of the lower two stage reinforced elastomer block spring/damper component 52. A connector component 54 engages the lower compression component 53 to the upper compression component 50 in such a manner that when the upper compression component 50 moves vertically away from the chassis 11, the lower compression component is drawn vertically away from the chassis 11 by the connector component 54. Thus, the lower two stage reinforced elastomer block spring/damper component 52 is compressed between the lower compression component 53 and the spring/damper mounting component 36, when the front portion of the suspended body structure 12 moves from its neutral position vertically away from the chassis 11. Therefore, the lower two stage reinforced elastomer block spring/damper component 52 resists movement of the front portion 43 of the suspended body structure from its neutral position away from the chassis 11. It should be understood that a vehicle body suspension system 17, according to the present invention, may further include more than one subassembly of upper and lower compression components, upper and lower elastomer block spring/damper components, and a spring/damper mounting component engaged to one another in the manner described herein above. For example, while the figures illustrate only one such h subassembly in the vehicle body suspension system 17 shown in the figures, the vehicle body suspension system 17 of the vehicle shown in the figures would likely comprise two such subassemblies which would support laterally opposite portions of the front portion 43 of the suspended body structure 12. Additionally, a vehicle body suspension system 17 according to the present invention may include four such subassemblies, two of which would support laterally opposite portions of said front portion 43 of said suspended body structure 12 and two of which would support laterally opposite portions of said rear portion of said suspended body structure 12. The construction and engagement to one another of the upper compression component 50, the lower compression component 53, and the connector component 54, may be any of a number of constructions that could be easily imagined by one of ordinary skill in the art and that would provide the above described functionality. The embodiment shown in the figures the connector component includes a bolt that extends through openings in the upper compression component 50 the upper two stage reinforced elastomer block spring/damper component 51, the spring/damper mounting component 36, the lower two stage reinforced elastomer block spring/damper component 52, and the lower compression component 53. In the embodiment shown in the figures, the connector component 54 comprises a nut that is threadedly engaged to the bolt of the connector component 54. One of, the bolt head and the nut of the connector component 54 is disposed upon an upper side of the upper compression component 50 and the other of the bolt head and the nut of the connector component 54 is disposed upon a lower side of the lower compression component. Such a construction and engagement to one another of the upper compression component 50, the lower compression component ,53, and the connector component 54 is well known and obviously provides for the above described functionality. Construction of this portion of the vehicle body suspension system 17 with a connector component 54 that comprises a bolt utilized in such a manner provides the added benefit of preventing horizontal movement of the portion of the suspended body structure 12 that is engaged to the upper compression component 50 relative to the chassis 11. The portion of the vehicle body suspension system 17 shown in the figures that is engaged to the front portion 43 of the suspended body structure 12 is, thus, exemplary, of one manner in which two stage reinforced elastomer block spring/damper components 32 may be utilized as primary spring/damper components 48 in a vehicle body suspension system 17. It will be understood that there are many other ways in which two stage reinforced elastomer block spring/damper components 32 could be engaged to a vehicle body suspension system 17 so that they would serve to resist relative movement between the suspended body structure 12 and the chassis within their intended range of relative positions and thus act as primary spring/damper components 48. It will also be understood that a vehicle body suspension system 17 according to the present invention may have structure similar to that described above for locating the front portion 43 of the suspended body structure 12 that comprises unreinforced elastomer block spring/damper components 19 instead of reinforced elastomer block spring/damper components 32.

One possible embodiment of a vehicle 10 according to the present invention and various portions of the assemblies and subassemblies of the vehicle 10 are illustrated in FIGS. 1, 8, 9, 10, 11, and 12. The vehicle body suspension system 17 of the vehicle shown in these figures is engaged to the suspended body structure 12 at mounting points 42 between the suspended body structure 12 and the vehicle body suspension system 17 at both the front portion 43 and the rear portion 44 of the suspended body structure 12. The vehicle body suspension system 17 of the vehicle 10 shown in the figures includes structure, as is described above, that is engaged to and serves to locate the front portion 43 of the suspended body structure 12 relative to the chassis 11. The portion of the vehicle body suspension system 17 that locates the front portion 43 of the suspended body structure 12 allows only relatively small relative movements between the front portion 43 of the suspended body structure 12 and the chassis 11. The rear portion 44 of the suspended body structure 12 of the vehicle shown these figures is supported by one or more primary spring/damper components 48 that resist movement of the suspended body structure away from its neutral position. The primary spring/damper components 48 that support the rear portion 48 of the suspended body structure 12 are constructed and engaged to the suspended body structure 12 and the chassis in such a manner that relatively large vertical movements of the rear portion 44 of the suspended body structure 12 relative to the chassis are allowed. The vehicle body suspension system 17 shown in the figures also includes panhard bar 55 constructed and engaged to the vehicle 10 in a well known manner to prevent substantial movement of the rear portion 44 of the suspended body structure 12 in lateral directions relative to the chassis 11. The primary spring/damper components 48 that support the rear portion 44 of the suspended body structure 12, of the vehicle 10 shown in the figures include air springs 56 and piston in cylinder damper components 57, the use of both of which in vehicle body suspension systems 17 is well known. The vehicle body suspension system 17 of the vehicle 10 shown in these figures further includes a two stage reinforced elastomer block spring/damper component 32 that acts as a bump stop 41 to limit vertical travel of the rear portion 44 of the suspended body structure 12 toward the chassis 11. It should be understood that utilizing a reinforced elastomer block spring/damper component 32 while not as beneficial as utilizing a two stage reinforced elastomer block spring/damper component 32 for the bump stop 41 of the vehicle 10 shown in the figures would still be preferred over utilizing an unreinforced elastomer block spring/damper component 19 as the bump stop 41. The two stage reinforced elastomer block spring damper component 32 that acts in such a manner as a bump stop 41 is mounted to a spring/damper mounting component 36 of the chassis 11 at a position near the rear portion 44l of the suspended body structure 12. This two stage reinforced elastomer spring/damper component 32 that acts as a bump stop 41 is mounted to the vehicle 10 with the compression axis 21 of its elastomer body 20 oriented substantially vertically. A compression component 39 of the vehicle body suspension system 17 is engaged to the suspended body structure 12 and is disposed directly above the two stage reinforced elastomer block spring/damper component 32 that acts as a bump stop 41. It will be understood that the spring/damper mounting component 36, to which the bump stop 41 is mounted, could be engaged to the suspended body structure 12 and the compression component 39 could be engaged to the chassis 11 and the bump stop would still provide essentially the same functionality. When the suspended body structure 12 of the vehicle 10 shown in the figures is in its neutral position relative to the chassis 11 a space is present between the bump stop 41 and the compression component 39 disposed above it. Thus, the bump stop 41 of the vehicle 10 shown in FIGS. 1, 8, 9, and 10 prevents the rear portion 44 of the suspended body structure 12 from impacting the chassis 11 when the rear portion 44 of the suspended body structure 12 moves vertically toward the chassis 11. As was mentioned, the elastomer body 20 of such a bump stop 41 can be compressed with considerable force between the compression component 39 and the spring/damper mounting component 36 to which it is mounted. For this reason the spring/damper mounting component 36 to which the bump, stop 41 is mounted, the compression component 39 that is disposed above the bump stop 41, and the structure that these components are engaged to must be of a relatively strong construction so that they are not damaged when the bump stop 41 is subjected to relatively large compression forces. In the embodiment shown in the figures the spring/ damper mounting component 36 to which the bump stop 41 is mounted is a crossmember of a frame ladder 46 of the vehicle 10. The compression component 39 shown in the figures is a rear sill 47 of thee suspended body structure 12. The rear sill 47 of the suspended body structure 12 is a transversely oriented reinforcing member for the floor of the suspended body structure 12 that is disposed adjacent a rearmost portion of the floor of the suspended body structure 12. A vehicle body suspension system 17 and a vehicle 10 may be constructed in any of a number of different ways that vary from the construction of the vehicle 10 shown in the figures and still be in accordance with the present invention.

Those skilled in the art will appreciate that modifications could be made to the invention as described without departing from the spirit and scope of the invention and thus the scope of the invention is limited only by the following claims.

We claim:

1. A vehicle, comprising:
   (a) a chassis;
   (b) wherein said chassis of said vehicle comprises a frame to which a large percentage of components of said vehicle are engaged either directly or indirectly and from which a large percentage of components of said vehicle derive support directly or indirectly;
   (c) wherein said chassis further comprises a primary suspension system that provides said vehicle with a relatively low resistance to translation along the ground and that is engaged to said frame in such a manner that it supports said frame above said ground;
   (d) a body structure that is constructed in such a manner that objects and/or individuals may be supported upon or within said body structure;
   (e) a vehicle body suspension system that is engaged to both said chassis of said vehicle and said body structure of said vehicle in such a manner that said body structure of said vehicle is supported by said vehicle body suspension system which is, in turn, supported by said chassis of said vehicle;
   (f) wherein said chassis, said vehicle body suspension system, and said body structure that is supported by said vehicle body suspension system are constructed in such a manner that said vehicle body suspension system allows for relative movement between said vehicle body structure and said chassis in certain directions and within limited ranges;
   (g) wherein said vehicle body suspension system comprises one or more spring/damper components that are engaged to said vehicle in such a manner that each of said spring/damper components resists relative motion between said body structure and said chassis of said vehicle, at least when said body structure and said chassis of said vehicle are in certain positions relative to one another;
   (h) wherein one or more of said spring/damper components of said vehicle body suspension system are reinforced elastomer block spring/damper components which comprise an elastomer body that is a block of elastomer material and which also comprise a reinforcement wall that is constructed of a very rigid material and which completely surrounds one or more cross-sections of said elastomer body of said elastomer block spring/damper component perpendicular to a compression axis of said elastomer body; and
   (i) wherein one or more of said elastomer bodies of one or more of said spring/damper components comprises at least some portion thereof that is both surrounded by one of said reinforcing walls and that is also engaged to said vehicle in such a manner that it is compressed between one of said spring/damper mounting components and said corresponding compression component, at least when said body structure is in certain positions relative to said chassis structure.

2. The vehicle of claim 1, wherein:
   (a) said body structure that is supported by said vehicle body suspension system is an operator cabin;
   (b) said operator cabin comprises a platform upon which an operator of said vehicle may stand and/or a seat upon which an operator of said vehicle may sit; and
   (c) all vehicle controls necessary to control operation of said vehicle in a majority of circumstances are disposed within said operator cabin at positions such that an operator may sit on said seat or stand on said platform of said operator cabin, operate said controls, and control operation of said vehicle.

3. The vehicle of claim 2, wherein:
   (a) one or more of said reinforced elastomer block spring/damper components are two stage reinforced elastomer block spring/damper components each respective two stage reinforced elastomer block spring/damper component being constructed in such a manner that, when its respective elastomer body is in a free state, there is a gap present between outer surfaces of a portion of its respective elastomer body that is surrounded by its respective reinforcing wall, which respective reinforcing wall is said reinforcing wall of one of said reinforced elastomer block spring/damper components of which each of said respective two stage elastomer block reinforced spring/damper components is one, and inner surfaces of its respective reinforcing wall.

4. The vehicle of claim 3, wherein:
   (a) said vehicle body suspension system is constructed in such a manner that one or more of said two stage reinforced elastomer block spring/damper components of said vehicle body suspension system are bump stop(s);
   (b) each of said two stage reinforced elastomer block spring/damper components that is a bump stop is mounted to a spring/damper mounting component that is engaged to either said chassis or said body structure of said vehicle;
   (c) each of said two stage reinforced elastomer block spring/damper components that is a bump stop is disposed between said spring/damper mounting component to which it is mounted and a corresponding compression component that is engaged to whichever of said chassis and said body structure that said spring/damper mounting component is not engaged to; and
   (d) said vehicle body suspension system is constructed in such a manner that, when said body structure of said vehicle is in a neutral position relative to sail chassis, a space is present between each of said two stage reinforced elastomer block spring/damper components that is a bump stop and said corresponding compression component.

5. The vehicle of claim 4, wherein:
   (a) said vehicle body suspension system is constructed and engaged to said chassis and said body structure in such a manner that a front portion of said body structure is allowed to move only relatively small amounts relative to said chassis; and
   (b) said vehicle body suspension system is constructed and engaged to said chassis and said body structure in such a manner that a rear portion of said body structure is allowed to move substantially in vertical directions relative to said chassis;

(c) one or more of said two stage reinforced elastomer block spring/damper components that are bump stop(s) are mounted to a spring/damper mounting component in such a position, that they are disposed between said rear portion of said body structure and said chassis in such a manner that they limit vertical movement of said rear portion of said body structure toward said chassis.

6. The vehicle of claim 5, wherein:

(a) said vehicle body suspension system comprises a first subassembly for supporting said front portion of said body structure;

(b) said first subassembly of said vehicle body suspension system comprises an upper compression component that is engaged to said front portion of said body structure;

(c) said first subassembly of said vehicle body suspension system comprises a spring/damper mounting component that is engaged to said chassis at a point such that at least a portion of it is disposed below at least some portion of said upper compression component;

(d) said first subassembly of said vehicle body suspension system comprises an upper elastomer block spring/damper component that is mounted to said vehicle body suspension system in such a position that it is disposed between said upper compression component and said spring/damper mounting component that is disposed below said upper compression component;

(e) when said body structure is in said neutral position relative to said chassis, said front portion of said body structure derives support from said upper compression component which derives support from said upper elastomer block spring/damper component which derives support from said spring/damper mounting component, which derives support from said chassis;

(f) said first subassembly of said vehicle body suspension system comprises a lower compression component that is disposed below said upper compression component and that is engaged to said upper compression component by a connector component in such a manner that, if said upper compression component moves vertically away from said chassis, said lower compression component is drawn vertically away from said chassis by said connector component;

(g) said first subassembly of said vehicle body suspension system comprises a lower elastomer block spring/damper component that is disposed below said upper elastomer block spring/damper component and between said spring/damper mounting component and said lower compression component;

(h) said upper compression component and said lower compression component are spaced relative to one another such that when said body structure is disposed in said neutral position relative to said chassis, said lower elastomer block spring/damper component is in contact with both said spring/damper mounting component and said lower compression component that it is disposed between;

(i) said vehicle body suspension system comprises a second subassembly constructed in a manner similar to said first subassembly and engaged to said body structure and said chassis in such a manner to locate and support a portion of said front portion of said body structure laterally opposite a portion of said front portion of said body structure that is supported by said first subassembly; and (j) said vehicle body suspension system comprises one or more primary spring/damper components that are engaged to said rear portion of said body structure and a portion of said chassis disposed below said rear portion of said body structure and that support said rear portion of said body structure and resist movement of said rear portion of said body structure away from said neutral position of said body structure relative to said chassis.

7. The vehicle of claim 6, wherein:

(a) said controls that are disposed within said operator cabin and are positioned such that an operator standing on said platform of said operator cabin or sitting on said seat of operator cabin can easily operate them include a steering wheel and control pedals.

8. The vehicle of claim 7, wherein:

(a) said operator cabin comprises windshield glass;

(b) said operator cabin defines one or more door openings through which an operator of said vehicle may enter said operator cabin;

(c) said operator cabin comprises one or more swingable doors which may be selectively opened or closed in order to cover or expose said one or more door openings defined by said operator cabin.

9. The vehicle of claim 8, wherein:

(a) said up per elastomer block spring/damper component and said lower elastomer block spring/damper component are reinforced elastomer spring/damper components.

10. The vehicle of claim 9, wherein:

(a) said upper elastomer block spring/damper component and said lower elastomer block spring/damper component are two stage reinforced elastomer spring/damper components.

11. The vehicle of claim 1, wherein:

(a) said vehicle body suspension system comprises a first subassembly for supporting a front portion of said body structure;

(b) said first subassembly of said vehicle body suspension system comprises an upper compression component that is engaged to said body structure;

(c) said first subassembly of said vehicle body suspension system comprises a spring/damper mounting component that is engaged to said chassis at a point such that at least a portion of it is disposed below at least some portion of said upper compression component;

(d) said first subassembly of said vehicle body suspension system comprises an upper reinforced elastomer block spring/damper component that is mounted to said vehicle body suspension system in such a position that it is disposed between said upper compression component and said spring/damper mounting component that is disposed below said upper compression component;

(e) when said body structure is in a neutral position relative to said chassis, said body structure derives support from said upper compression component which derives support from said upper reinforced elastomer block spring/damper component which derives support from said spring/damper mounting component, which derives support from said chassis;

(f) said first subassembly of said vehicle body suspension system comprises a lower compression component that is disposed below said upper compression component and that is engaged to said upper compression component by a connector component in such a manner that, if said upper compression component moves vertically away from said chase said lower compression component is drawn vertically away from said chassis by said connector component;

(g) said first subassembly of said vehicle body suspension system comprises a lower reinforced elastomer block spring/damper component that is disposed below said upper reinforced elastomer block spring/damper component and between said spring/damper mounting component and said lower compression component; and (h) said first subassembly of said upper compression component and said lower compression component are spaced relative to one another such that, when said body structure is disposed in said neutral position relative to said chassis, said lower reinforced elastomer block spring/damper component is in contact with both said spring/damper mounting component and said lower compression component that it is disposed between.

12. The vehicle of claim 11, wherein:

(a) said body structure that is supported by said vehicle body suspension system is an operator cabin;

(b) said operator cabin comprises a platform upon which an operator of said vehicle may stand and/or a seat upon which an operator of said vehicle may sit; and (c) all vehicle controls necessary to control operation of said vehicle in a majority of circumstances are disposed within said operator cabin at positions such that an operator may sit on said seat or stand on said platform of said operator cabin, operate said controls, and control operation of said vehicle.

13. The vehicle of claim 12, wherein:

(a) said vehicle body suspension system comprises one or more additional subassemblies constructed in a manner similar to said first subassembly and engaged to said body structure and said chassis in such a manner to locate and support portions body structure other than a portion of said body structure that is supported by said first subassembly.

14. The vehicle of claim 13, wherein:

(a) said controls that are disposed within said operator cabin and are positioned such that an operator standing on said platform of said operator cabin or sitting on said seat of operator cabin can easily operate them include a steering wheel and control pedals.

15. The vehicle of claim 14, wherein:

(a) said upper reinforced elastomer block spring/damper component and said lower reinforced elastomer block spring/damper component are two stage reinforced elastomer spring/damper components.

16. The vehicle of claim 15, wherein:

(a) a said operator cabin comprises windshield glass;

(b) said operator cabin defines one or more door openings through which an operator of said vehicle may enter said operator cabin; and (c) said operator cabin comprises one or more swingable doors which may be selectively opened or closed in order to cover or expose said one or more door openings defined by said operator cabin.

* * * * *